R. BUNKER.
Draft Eveners.
No. 137,286.  Patented April 1, 1873.
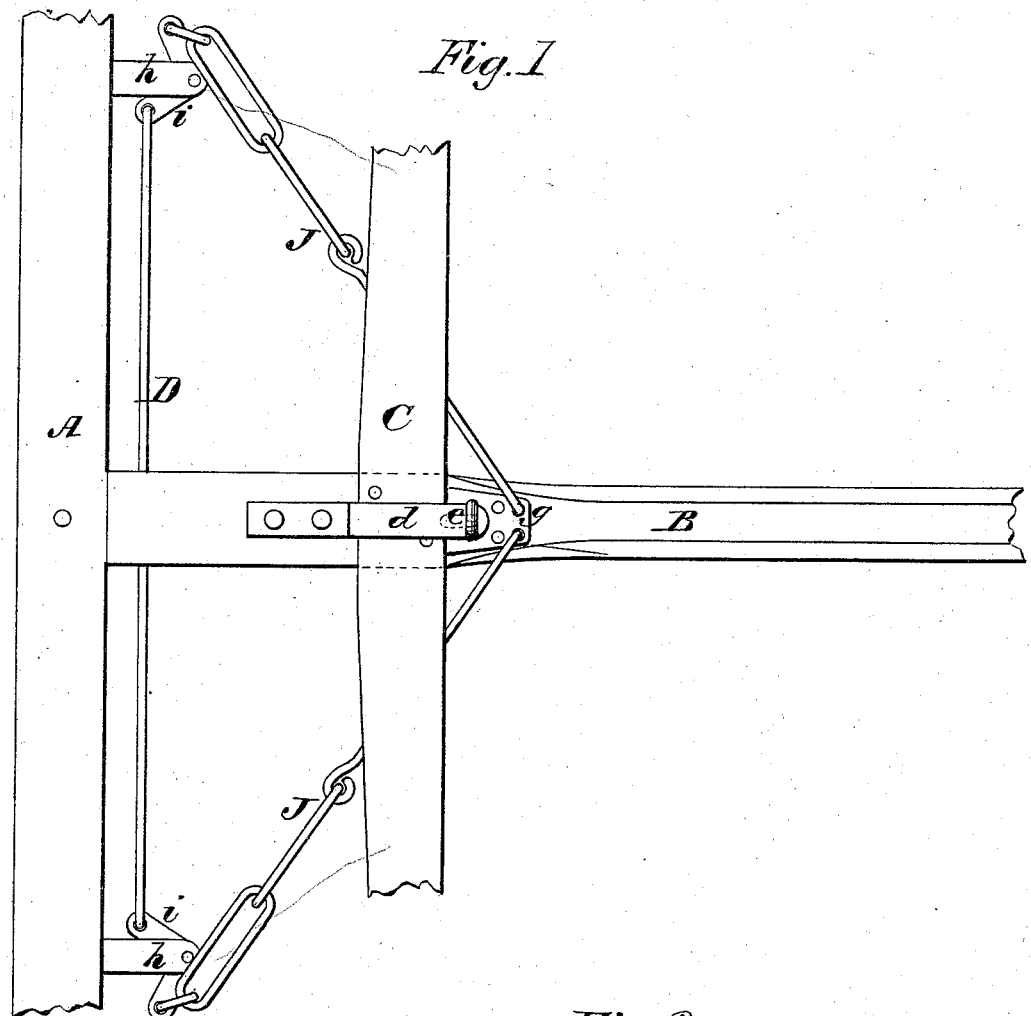
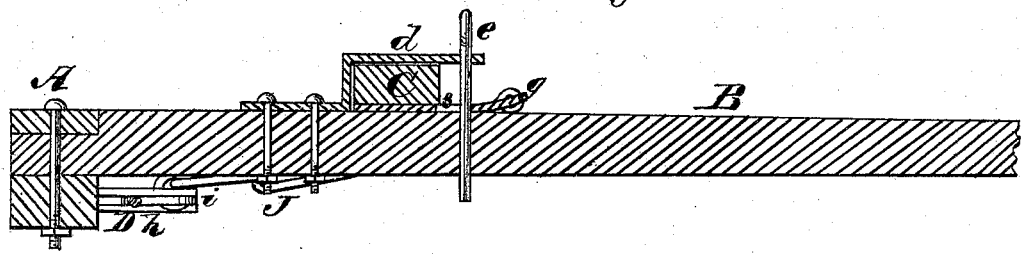

UNITED STATES PATENT OFFICE.

RUSSELL BUNKER, OF HUDSON, WISCONSIN.

IMPROVEMENT IN DRAFT-EVENERS.

Specification forming part of Letters Patent No. 137,286, dated April 1, 1873; application filed September 7, 1872.

*To all whom it may concern:*

Be it known that I, RUSSELL BUNKER, of Hudson, in the county of St. Croix and State of Wisconsin, have invented a new and Improved Draft-Evener; and I do hereby declare that the following is a full, clear, and exact description thereof, reference being had to the accompanying drawing making part of this specification, in which—

Figure 1 is a top view of the evener. Fig. 2 is a section taken longitudinally through the evener.

Similar letters of reference indicate corresponding parts in the two figures.

To the pole-bar A the draft-pole B is rigidly secured, and across this pole lies the double-tree C. This double-tree C has connected rigidly to it, at the middle of its length, a tongue-piece, $g$, which extends forward of the double-tree a short distance and is pivoted to the pole B by means of a removable vertical pin, $e$, which passes through an overhanging piece, $d$, through a longitudinally oblong slot, $s$, made through said tongue-piece $g$, and through the pole. The double-tree C is thus allowed to vibrate; and it is also allowed a slight bodily movement forward and backward. To the front end of the tongue-piece $g$ chains J J are attached. These chains or chains and rods extend backward and outward, and are attached at their rear ends to right-angle levers $i\ i$, which are pivoted to short arms $h\ h$ made fast to the bar A. The inner arms of the levers $i\ i$ are connected together by a transverse rod, D, extending across beneath the pole B.

The evener which I have above described is designed for equalizing the draft when a wheel on one side of a vehicle is obstructed; also for keeping the tongue or pole from deviating to the right or left.

It will be seen that the draft of the two horses is transferred from the double-tree to the pole-bar A, through the medium of chains J J, levers $i\ i$, and a connecting-rod, D; consequently, when the wheel of a wagon or other vehicle is obstructed, both horses will pull on the obstructed wheel. If desirable, the chains or rod J may be connected directly to the double-tree near its extremities.

Having described my invention, what I claim as new, and desire to secure by Letters Patent, is—

1. The vibrating and bodily movable double-tree C, connected by chains J J to connected levers $i\ i$, substantially as described.

2. The slotted tongue-piece $g$ on double-tree C, connected by a pin, $e$, to the pole B, and connected to the pole-bar A by means of levers $i\ i$, a connecting-rod, D, and arms $h\ h$, substantially as described.

RUSSELL BUNKER.

Witnesses:
HENRY A. WILSON,
CHAS. Y. DENNISTON.